Jan. 1, 1952
G. H. DRYDEN
2,581,084
DRAGGING EQUIPMENT DETECTOR FOR RAILROADS
Filed March 1, 1947
3 Sheets-Sheet 1
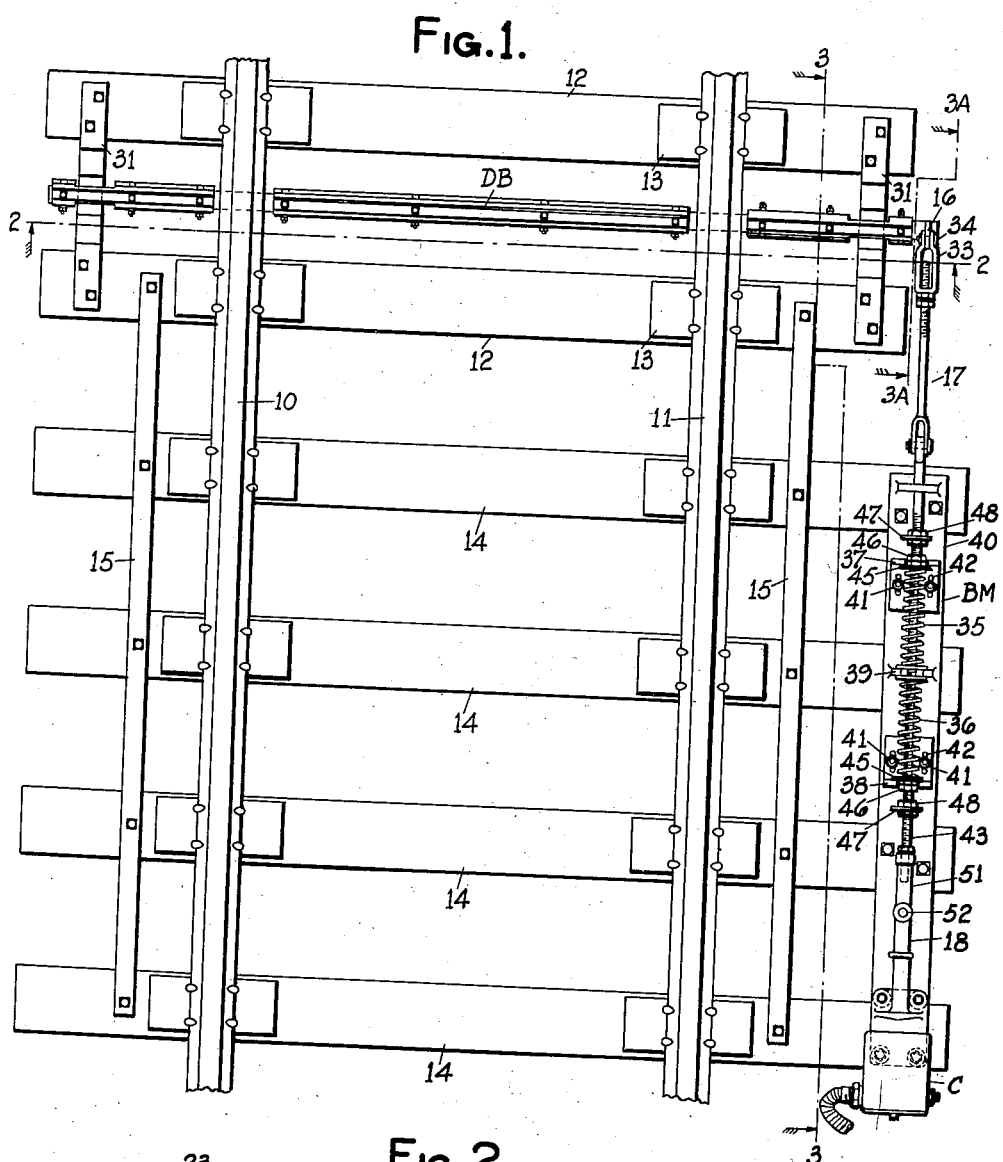
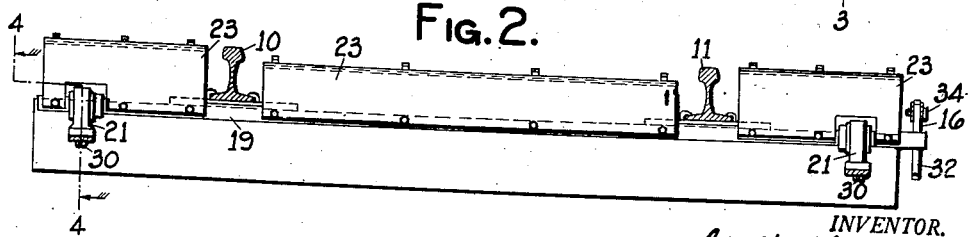
INVENTOR.
G. H. Dryden,
BY Neil W. Preston,
his ATTORNEY Jan. 1, 1952               G. H. DRYDEN               2,581,084
DRAGGING EQUIPMENT DETECTOR FOR RAILROADS
Filed March 1, 1947                                            3 Sheets—Sheet 2
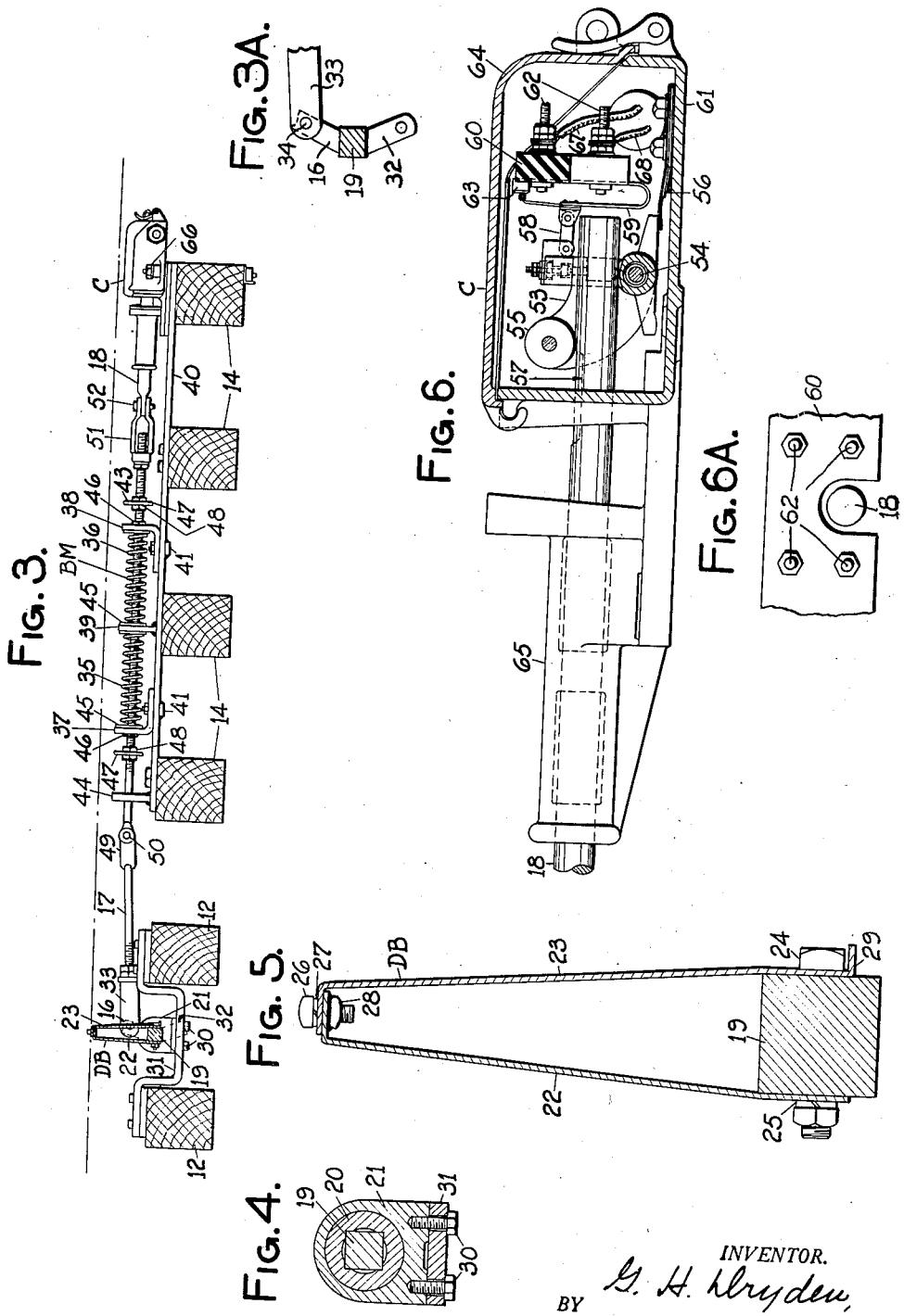
INVENTOR.
BY G. H. Dryden,
Neil W. Preston,
his ATTORNEY

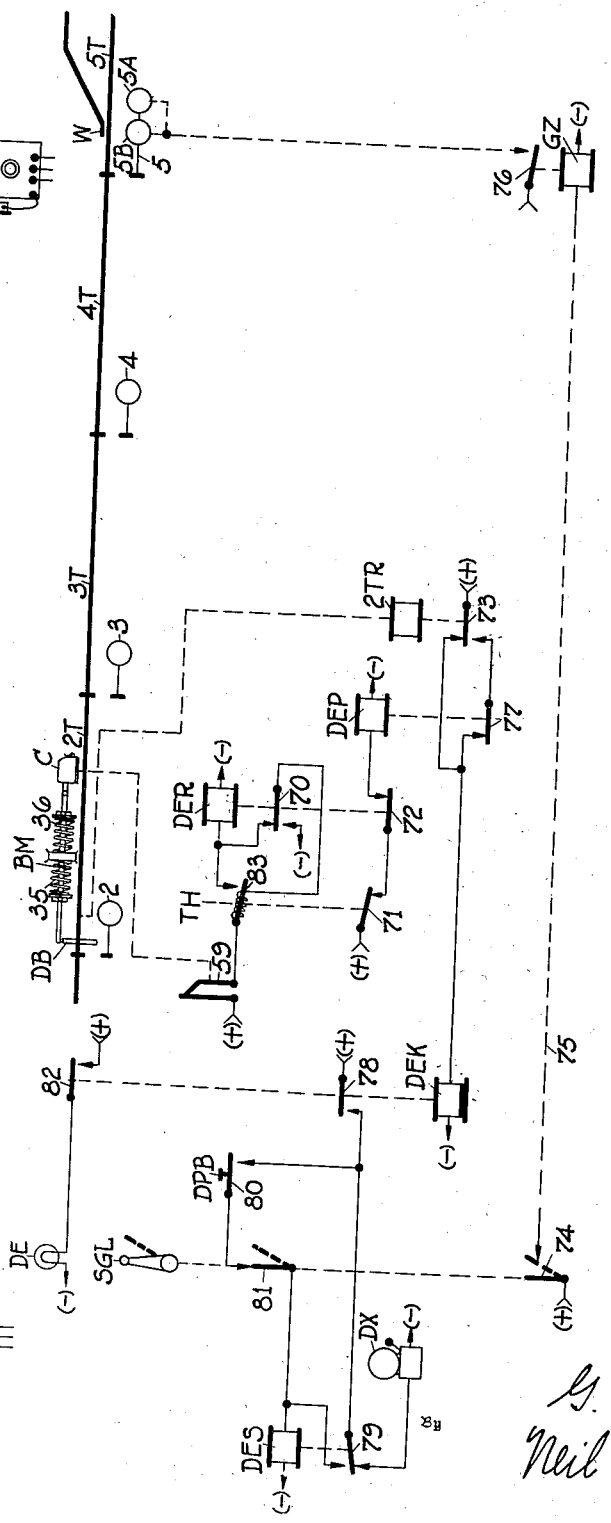

Patented Jan. 1, 1952

2,581,084

UNITED STATES PATENT OFFICE 2,581,084

DRAGGING EQUIPMENT DETECTOR FOR RAILROADS

George H. Dryden, Baltimore, Md., assignor to General Railway Signal Company, Rochester, N. Y.

Application March 1, 1947, Serial No. 731,735

10 Claims. (Cl. 246—219)

This invention relates to signaling systems for railroads, and it more particularly pertains to means for detecting equipment dragging beneath the cars of a train and indicating such detection at a control office.

Equipment dragging beneath cars often causes derailment directly, or indirectly by damage to track apparatus. It is therefore desirable to check trains for dragging equipment at various points along the trackway where cars having dragging equipment can be readily set out of the train.

It is an object of the present invention to dispose a yieldable barrier across the trackway for detecting dragging equipment, such barrier being of a height to clear standard under-carriage equipment of trains when in proper place but to be actuated by equipment dragging at any point beneath the train.

Another object of the present invention is to provide a dragging equipment detector barrier and associated biasing means of rugged construction which is not readily damaged by dragging equipment. It is further provided that sections if damaged can be readily replaced.

Another object of the present invention is to sound an alarm and provide a visual indication at a control office for a predetermined length of time in response to the actuation of a dragging equipment barrier.

Another object of the present invention is to provide means whereby an operator at the control office can silence an alarm sounded by actuation of the detector barrier only provided an office controlled signal is put to stop in advance of the train having actuated such barrier.

Another object of the present invention is to render the detector barrier effective to indicate at the control office only if a train is in the track section in which the barrier is located at the time when the barrier is actuated.

Other objects, purposes, and characteristic features of the present invention will be in part obvious from the accompanying drawings and in part pointed out as the description of the invention progresses.

In describing the invention in detail, reference is made to the accompanying drawings in which similar reference characters are used to designate similar and corresponding parts in the several views, and in which:

Fig. 1 is a plan view of a portion of railway track equipped with dragging equipment detector mechanism according to the present invention;

Fig. 2 is an elevational view partly in cross section of the dragging equipment detector barrier as viewed along the section line 2—2 of Fig. 1;

Fig. 3 is an elevational view of the mechanism actuated by the detector barrier as viewed along the section line 3—3 of Fig. 1;

Fig. 3A is an elevational view partially in cross section of connecting linkage taken along the section line 3A—3A of Fig. 1;

Fig. 4 is a sectional view of a bearing for journaling the detector barrier as viewed along the line 4—4 of Fig. 2;

Fig. 5 is an enlarged sectional end view of the detector barrier;

Fig. 6 is an elevational sectional view of a circuit controller which is actuated by the detector barrier;

Fig. 6A is a plan view of a portion of a terminal board to which wiring connections for the detector actuated contacts can be made;

Fig. 7 is a circuit diagram illustrating the manner in which signaling circuits are effected by the actuation of the dragging equipment detector; and Fig. 8 is a modification of the indicating apparatus.

With reference to Fig. 1, the dragging equipment detector is illustrated as being applied to a portion of railway track comprising the track rails 10 and 11, conventional ties 12 and tie plates 13, and the four elongated ties 14 for mounting a biasing mechanism BM and a switch circuit controller C. Conventional tie straps 15 are provided for maintaining the ties in parallel alignment.

The general organization of the dragging equipment detector apparatus is that the detector barrier DB is disposed between the ties 12 and it is coupled through a crank 16 and a connecting rod 17 to the left-hand end of the biasing mechanism BM. The right-hand end of the biasing mechanism BM is connected to a longitudinal operating plunger 18 of the circuit controller.

The specific detector barrier illustrated comprises a substantially square detector bar 19 (see Figs. 2 and 5) extending beneath the track rails and between the ties 12 extending for a length substantially the same as the length of the ties 12. Bushings 20 (see Fig. 4) are provided for adapting the bar 19 to be journaled in the bearings 21 at the respective ends of the detector barrier DB and barrier plates 22 and 23, preferably of sheet metal extend upwardly from the bar 19, both between and outside of the rails 10 and 11. The barrier plates 22 and 23 are suitably secured to the bar 19 in a manner to be readily replaced if damaged by dragging equipment as by bolts 24 and lock washers 25, (see Fig. 5). The oppositely disposed plates 22 and 23 are secured together at the top by the bolts 26 and lock washers 27, the nuts 28 being preferably secured to the underside of the top edge of the barrier plate 22 to facilitate the top assembly of the plates. The plate 23 has its lower edge 29 formed outwardly from the bar 19 to serve as a lock for the heads of the bolts 24.

With reference to Fig. 2 it will be noted that the barrier plates 22 and 23 outside of the track rails extend slightly above the track rails as compared to the barrier plates 22 and 23 between the track rails which are slightly lower than the track rails. Although it is to be understood that the height of the barrier plates can be determined according to the requirements of practice, it has been found that the relative heights illustrated are particularly satisfactory to correspond with the clearance required for standard train undercarriage equipment.

With reference to Figs. 1 and 3, the bearings 21 are secured as by the bolts 30 to brackets 31 which in turn are secured across the respective ends of the ties 12.

With reference to Figs. 1 and 2, a crank is suitably secured to the right-hand end of the bar 19, as by welding, having crank arms 16 and 32 extending above and below the bar 19 respectively to which the connecting rod 17 having an adjustable jaw 33 can be connected as by the pin 34. The direction of longitudinal movement of the connector rod 17 with respect to the actuation of the detector barrier is determined by whether such connecting rod is connected to the lower crank arm 32 or upper crank arm 16 as viewed in Fig. 2.

The biasing springs 35 and 36 are compressed between respective brackets 37 and 38 and a common abutment 39. The abutment 39 is suitably secured as by welding to a base plate 40 which extends across and is secured to the extended ends of the four ties 14. The brackets 37 and 38 are adjustably secured to the base plate 40 by bolts 41 extending through longitudinal mounting holes 42. It is therefore provided by the adjustment of the brackets that the sensitivity of the barrier is adjusted because of the means provided for adjusting the normal biasing pressure of the springs 35 and 36.

A threaded operating rod 43 extends longitudinally concentric with the springs 35 and 36 and through the brackets 37 and 38 and the abutment 39 to operably connect the circuit controller plunger 18 and the connecting rod 17. Such operating rod is journaled in a bearing plate 44 suitably secured as by welding to the left-hand end of the base plate 40.

The washers 45 at the ends of the respective springs 37 and 38 fit freely on the operating rod 43 and are urged by such springs against the brackets 37 and 38 and abutment 39. The nuts 46 are adjusted to make contact with the washers 45 at the brackets 37 and 38 when the biasing mechanism BM is in its normal position as illustrated, the openings for the operating rod 43 in the respective brackets being of sufficient size to allow passage of the nuts 46 but not the washers 45.

Spaced to the left and right from brackets 37 and 38 respectively are washers 47 adjustably positioned by nuts 48 to form stops acting against the brackets 37 and 38 to limit the extent of longitudinal movement of the operating rod 43.

The jaw 49 at the right-hand end of the connecting rod is coupled to the operating rod 43 by the pin 50, and a jaw 51 is threaded on to the right-hand end of the operating rod 43 to provide longitudinal adjustment for the connection of the biasing mechanism BM to the plunger 18 of the circuit controller C. The jaw 51 when properly adjusted is coupled to the longitudinal plunger 18 of the circuit controller C by the pin 52.

With reference to Fig. 6, the circuit controller C comprises a longitudinal operating plunger 18 which governs the operation of the rocker 53 about the pivot point 54. The rocker 53 has its roller 55 biased against the plunger 18 by the leaf spring 56 suitably secured to the bottom of the circuit controller case so as to cause the rocker 53 to rotate in a counter-clockwise direction when the plunger 18 is actuated to the right to allow the roller 55 to drop into the notch 57 in the top of the plunger 18. The rocker 53 is connected by a link 58 to the normally closed contact finger 59 so as to open such contact when the rocker 53 is actuated in a counter-clockwise direction upon the dropping of the roller 55 into the notch 57 in the top of the lock plunger 18. A terminal board 60 is suitably secured within the case 61 of the circuit controller C having binding posts 62 securing a stationary contact 63 and the movable contact 59 to the terminal board 60 and providing a convenient means for making wiring connections to such contacts. The terminal board 60 has an opening to allow passage of the plunger 18 as shown by the section view taken substantially at the center of the terminal board.

A tight fitting cover 64 protects the circuit controller operating mechanism and the contacts from damage by dirt and moisture. Extending from the left of the circuit controller case 61 is a bearing 65 for the plunger 18, and because of the coupling of the plunger 18 to the operating rod 43, such bearing also serves as a bearing for locating the right-hand end of the operating rod 43 concentric with the holes of the respective brackets 37 and 38 and the abutment 39. The circuit controller C and the right-hand end of the base plate are suitably secured to the right-hand tie 14 as by the bolts 66.

To consider the mode of operation of the dragging equipment detecting mechanism, it will be assumed that the barrier DB is struck by equipment dragging from a train proceeding in a direction to actuate the detector barrier DB in the direction of the circuit controller. With reference to Fig. 3, the actuation of the crank 16 to the right actuates the connecting rod 17 to the right and thus compresses the spring 35 of the biasing mechanism, the spring 36 remaining under normal compression. The actuation of the operating rod 43 to the right actuates the circuit controller plunger 18 to the right, and thus allows the roller 55 (see Fig. 6) to drop into the notch 57 in the top of the rocker 53 in a counter-clockwise actuation of the rocker 53 in a counter-clockwise direction. Such operation of the rocker 53 moves the contact finger 59 away from its normally closed position against the stationary contact 63 to open the circuit including the wires 67 and 68. The longitudinal movement of the rod 43 of the biasing mechanism BM is rendered effective only to the extent limited by the washer 47 at the left of the bracket 37. The barrier DB is immediately restored to its normal upright position by the biasing pressure applied to the operating rod 43 by the spring 35.

Although the dragging equipment detector, when the connecting rod 17 is connected to the crank arm 16 as above described, is effective to open the contact 59 of the circuit controller C only when the detector barrier DB is actuated in a direction toward such circuit controller, it will be readily apparent that the barrier DB is yieldable by the compression of spring 36 when actuated in the other direction so that it will not be damaged by dragging equipment of trains actuating the barrier DB away from the circuit controller. The actuation of the plunger 18 of the circuit controller to the left maintains the contact operating rocker 53 in its normal position because of the roller 55 failing to drop into a slot in the plunger 18.

If the dragging equipment detector is to be used in a track layout where it is desirable that the actuation of the barrier DB in a direction away from the circuit controller C is to be effective to open the contact 59 of the circuit controller, rather than having such contact 59 opened by actuation of the barrier DB toward the circuit controller C, a reversal in the relative operation of the longitudinal operating rod 43 with respect to the actuation of the detector barrier DB can be accomplished by making the connection of the connecting rod 17 to the lower crank arm 32 of the detector barrier DB rather than the top arm 16.

Having thus considered the operating structure of the dragging equipment detector mechanism, with reference to Fig. 7, consideration will be given to the mode of operation of a signaling system employing such dragging equipment detector means.

In Fig. 7, a stretch of railway track is illustrated as being divided into the track sections 2T, 3T, 4T and 5T, and signals 2, 3, 4, and 5 are provided for governing entrance to such respective track sections for eastbound traffic (to the right). The signal 5 is assumed to be a manually controlled signal having a top arm 5A for governing through traffic, and a lower arm 5B for governing a diverging route over the track switch W.

The signals are assumed to be of the searchlight type having signal operating mechanisms of a structure, for example, as is described in the patent to O. S. Field, Patent No. 2,239,316, dated April 22, 1941; but it is to be understood that other types of signals such as semaphore, position light, or color light signals having individual color lamps can as well be employed in accordance with the requirements of practice.

For the purpose of simplification of the disclosure of the system provided according to the present invention, only the portion of the signalling control apparatus effected by the dragging equipment detector have been shown, as it will be readily apparent that the circuits shown can be applied in addition to the conventional signal control systems generally encountered in practice.

To facilitate in the disclosure of the present invention a conventional schematic wiring diagram is employed in which the symbols (+) and (—) are used to indicate the respective positive and negative terminals of batteries or another suitable direct current source of energy.

With reference to Fig. 7, in addition to the structural apparatus for dragging equipment detection as heretofore described, a relatively quick-acting normally energized stick relay DER is governed by the circuit controller C, and a time element relay TH, preferably of the thermal type, is provided for governing the restoration of the relay DER. A relay DEP is provided for repeating the operation of the relay DER and checking the operation of the thermal relay TH.

A slow acting indication relay DEK is provided at the control office for governing indications at the control office in accordance with the actuation of the dragging equipment detector barrier DB. The bell DX is provided at the control office as an audible signal, and the initiation of such bell is rendered effective by the dragging equipment indication relay DEK. A stick relay DES is provided for silencing the bell DX in accordance with the actuation of the push button DPB, and an indication lamp DE is provided for indicating certain conditions to be hereinafter described with respect to the mode of operation of the system in the detection of dragging equipment.

According to the embodiment of the invention illustrated in Fig. 7, the dragging equipment detector relay DER is maintained normally picked up by a stick circuit extending from (+), including the normally closed detector contact 59, winding of the thermal relay TH, front contact 70 of relay DER and winding of relay DER, to (—). Because of the inclusion of the high resistance winding of the relay DER in series with the heating element of the thermal relay TH, the thermal relay is not sufficiently heated to open its normally closed back contact 71, and thus the relay DEP is also normally energized by an obvious circuit including normally closed contact 71 of the thermal relay TH and front contact 72 of the relay DER.

Assuming the trackway to be normally unoccupied by trains, the track relay 2TR is normally picked-up, and by the closure of its front contact 73, the relay DEK at the control office is normally energized.

Assuming for the purpose of considering a typical condition for the operation of the dragging equipment detector, that an operator at the control office actuates a signal control lever SGL to its right-hand position to allow the signal 5A or the signal 5B to be cleared, as selected by the position of the track switch W. In accordance with the actuation of the signal control lever SGL to its right-hand position, the contact 74 of that lever in its right-hand position establishes a circuit, which may include various contact selections in accordance with the requirements of practice as indicated by the dotted line 75, to cause the picking up of the signal control relay GZ, which is generally located in the field relatively close to the signals 5A and 5B with which that relay is associated. In accordance with the picking up of relay GZ, the closure of front contact 76 of that relay allows the signal 5A or 5B, as selected by the position of the switch W, to be energized to its caution or clear position, dependent upon the conventional automatic track circuit control (not shown) dependent upon occupancy conditions in advance of that signal. The signals 2, 3, and 4 are assumed to be automatic signals of the type that is normally clear, the signal 4 displaying a caution indication whenever the signals 5A and 5B are both at stop.

Assuming an eastbound train to accept signal 2, the passage of the train over the detector barrier DB provides that such barrier is subject to be tripped by equipment dragging from any of the cars of that train, and assuming it to be actuated by the passage of that train, the momentary opening of the detector contact 59 causes the dropping away of the relatively quick-acting relay DER. The dropping away of that relay, by opening front contact 72 insures the dropping away of the relay DEP.

Because of the presence of the train in the track section 2T, the relay 2TR is dropped away, and the dropping away of that relay opens the circuit by which relay DEK is normally energized at front contact 73. Assuming the relay DEP to be dropped away because of the barrier DB having been actuated, the front contact 77 of relay DEP in the circuit for relay DEK is opened so that the closure of back contact 73 of relay 2TR cannot be effective to maintain the relay DEK picked up.

It will be noted that the circuit for the control of the relay DEK is so organized that the contact 77 of the dragging equipment detector relay DEP is bridged by front contact 73 of relay 2TR whenever the track section 2T is unoccupied. It is thus provided that the actuation of the barrier DB in an unauthorized manner, when there is no train present in the track section 2T, is ineffective to cause an indication at the control office, and the restoration of the relays DER and DEP becomes effective in a manner to be hereinafter described, the same as if the barrier DB were actuated by a train. If the barrier DB is not actuated when the track section 2T is occupied by a train the circuit for relay DEK is maintained closed through back contact 73 of relay 2TR in series with front contact 77 of relay DEP. Relay DEK is made sufficiently slow acting to be maintained picked up during the shifting of contact 73 of relay 2TR.

At the control office, the dropping away of relay DEK initiates the sounding of the bell DX by the closure of back contact 78, such bell being energized through back contact 79 of relay DES. The operator at the control office, upon hearing the bell is aware that the train in track section 2T has actuated the detector barrier DB, and thus he restores the manually controlled signal 5 to stop in order that he may stop the train and instruct the trainman, as by telephone communication, to check over his train for dragging equipment.

Subsequent to the actuation of the signal control lever SGL to its center position for opening the circuit for the relay GZ at contact 74 to restore the signal 5 to stop, the operator can silence the bell DX by the actuation of the push button DPB. The actuation of the push button DPB causes the picking up of the relay DES, with the signal lever SGL in its center position, by the energization of a circuit extending from (+), including back contact 78 of relay DEK, contact 80 of button DPB in its depressed position, contact 81 of lever SGL in its center position and winding of relay DES, to (−). The picking up of relay DES silences the bell DX by opening its circuit at back contact 79, and establishes a stick circuit closed at front contact 79 by which that relay is maintained picked up until the indication relay DEK is again restored to its normally energized position, irrespective of the contact 81 of the signal control lever SGL remaining in its center position.

Upon the dropping away of relay DEK a circuit is closed at back contact 82 to energize the indicator lamp DE which is preferably associated with the signal control lever SGL. The lamp DE thus points out to the operator the signal lever that should be restored to its center position. Such lamp remains energized until the indication relay DEK is again picked up irrespective of the silencing of the bell DX by the actuation of the push button DPB.

After the dropping away of the relay DER when the detector barrier DB has opened the detector contact 59, an energizing circuit is closed for the winding of the thermal timing relay TH to start the timing of that relay. Such circuit extends from (+) including detector contact 59, winding of the thermal relay TH and back contact 70 of relay DER, to (−). After a time required for the operation of the thermal relay TH, determined in accordance with the requirements of practice, the front contact 83 of the thermal relay TH is closed to allow the picking up of the relay DER by the energiziation of an obvious circuit. When such relay is picked up its stick circuit is again established at front contact 70 and the actuating circuit for the thermal relay is opened to restore the conditions of energization of relay DER to normal conditions which have been heretofore described.

Subsequent to the restoration of the relay DER to its picked-up position, and the cooling of the thermal relay TH to close its back contact 71, the relay DEP is restored to its normally deenergized position in an obvious manner, and the picking up of that relay, by the closure of front contact 77 causes the picking up of the indication relay DEK at the control office if the track section 2TR is still occupied by the train by the energization of a circuit which has been described. If the track section 2TR has become unoccupied by the train prior to the relay DEP having been picked up, the relay DEK is obviously picked up in response to the picking up of relay 2TR.

At the control office the opening of back contact 78 of relay DEK in accordance with restoration to normal of the field control apparatus as described above causes the restoration of the relay DES by opening the stick circuit for that relay. The lamp DE is extinguished by the opening of the circuit for that lamp at back contact 82 of relay DEK.

In accordance with the operating requirements of the railroad, after the train has checked its equipment and reported to the operator at the control office, the operator at the control office can proceed to again clear signal 5A or 5B for passage of the train over a route selected by the positioning of the track switch W, the track switch W being perhaps used, if required, in cutting the car having the defective equipment out of the train.

A modification of the circuit means for the control of relay DEK is shown in Fig. 8 which can be employed if it is desired to check the restoration of the dragging equipment detector apparatus after it has once been actuated. The circuit for the control of the relay DEP is the same as has been described except that a stick circuit is added including front contact 90 of relay 2TR and front contact 91 of relay DEP. This stick circuit is effective to maintain the relay DEP picked up when there is no train in the track section 2T.

The relay DEK for governing indications at the control office is energized directly in accordance with the closure of front contact 92 of relay DEP, and thus the relay DEK is picked up after the dragging equipment detector barrier DB has been actuated, to cancel indications at the office, only after the dragging equipment detector apparatus has been properly restored subsequently to its actuation.

Having thus described a dragging equipment detector system as one embodiment of the present invention it is desired to be understood that this form has been selected to facilitate in the disclosure of the present invention rather than to limit the number of forms which the present invention may assume, and it is to be further understood that various adaptations, alterations and modifications may be applied to the specific form shown to meet the requirements of practice without in any manner departing from the spirit or scope of the present invention except as limited by the appended claims.

What I claim is:

1. In a signaling system for a stretch of railway track divided into a plurality of adjoining track sections, a wayside signal manually controlled from a control office for governing passage of a train in a given direction, manually operable means at the control office for designating respective stop and proceed controls for said signal, a yieldable detector barrier disposed across the trackway in a particular track section in the rear of said signal so as to be actuated by dragging equipment of a train proceeding in said given direction, a contact operated by the actuation of said barrier, normally inactive indication means at the control office, and electro-responsive means effective to render said indication means active in response to the operation of said contact, said means being rendered effective only if said particular track section is occupied by a train at the time when said contact is operated whereby the rendering active of said indication means advises the operator that said manually operable means should be operated to designate a stop control for said signal, and whereby accidental actuation of the barrier when no train is present within the associated track section is ineffective to cause an erroneous indication for the operator.

2. In a signaling system for a stretch of railway track having a signal manually controlled from a control office for governing passage of a train in a given direction, manually operable means at the control office for designating respective stop and proceed controls for said signal, a dragging equipment detector barrier disposed across the trackway in the rear of said signal, a normally closed contact momentarily opened up on the actuation of said barrier, a relatively quick-acting stick relay having a stick circuit normally energized through said normally closed contact whereby said relay is dropped away in response to the actuation of said barrier by equipment dragging from beneath a train, an audible indicator at the control office rendered active when said relay is dropped away, and manually controlled electro-responsive means at the control office effective when manually actuated to silence said audible indicator, only provided said manually operable means is actuated to a position to designate a stop indication for said signal.

3. A signaling system for a stretch of railway track comprising a signal manually controlled from a control office for governing passage of a train in a given direction, manually operable means at the control office for designating respective stop and proceed controls for said signal, a yieldable dragging equipment detector barrier disposed across the trackway in the rear of said signal so as to be actuated by equipment dragging from a train proceeding in said given direction, a contact actuated by the actuation of said barrier, an audible indicator at the control office rendered active when said contact is actuated, a visual indicator at the control office rendered active when said contact is actuated, electro-responsive means for rendering said audible indicator and said visual indicator effective for a predetermined time interval after actuation of said contact, and manually controlled electro-responsive means at the control office effective when manually actuated to silence said audible indicator but not said visual indicator, only provided said manually operable means is actuated to designate a stop indication of said signal.

4. In a dragging equipment detector system for railroads comprising in combination, a track section having a track circuit including a track relay, a detector barrier disposed across said track section, said barrier being spring biased to a vertical position so as to be yieldable in either direction from its vertical position when contacted by dragging equipment of a passing vehicle, a normally closed detector contact actuated to its open position by actuation of said barrier in one direction only from its vertical position, a stick relay normally energized through said normally closed detector contact, an indicator, and electro-responsive means for actuating said indicator in response to the dropping away of said stick relay, said electro-responsive means being effective only provided that said track relay is dropped away, whereby the track section must be occupied in order for the actuation of the barrier to be effective to actuate the indicator.

5. In a dragging equipment detector system for railroads comprising, a track section having a track circuit including a track relay, a detector barrier of the self-restoring type disposed across said track section, a normally closed detector contact opened when said detector barrier is actuated, a normally energized stick relay maintained energized dependent upon the closed condition of said detector contact, an indicator for indicating when said barrier is actuated, and electro-responsive means responsive to the deenergization of said stick relay for actuating said indicator, said electro-responsive means being rendered effective upon the dropping away of said stick relay only provided said track relay is dropped away, whereby the erroneous actuation of said barrier at a time when there is no train in said track section does not actuate said indicator.

6. In a dragging equipment detector system for railroads comprising in combination, a stretch of railway track, a dragging equipment detector contact mechanism disposed in said stretch of track so as to be actuated by equipment that may be dragging beneath a passing train, an indicator for indicating when said detector contact mechanism is actuated, a track circuit in said stretch including a track relay for the portion of said stretch including said dragging equipment detector, an indication relay, circuit means for actuating said indication relay when said contact mechanism is actuated, said circuit means being ineffective if said track relay is energized, and circuit means for controlling said indicator in accordance with the actuation of said indication relay.

7. In a dragging equipment detector system for railroads comprising in combination; a stretch of track having a side track associated therewith; a dragging equipment detector mechanism having a pivotally supported barrier disposed across said stretch of track in approach of said side track, a double ended crank secured to said barrier so as to be rotated thereby, a contact, a connecting rod providing a coupling between said crank and said contact, said connecting rod being caused to move longitudinally by rotation of said crank, such longitudinal movement of said connecting rod actuating said contact only provided that the rod is actuated in a particular direction from a given normal position, said connecting rod being coupled to one end or the other of said double ended crank, dependent upon whether said siding is disposed in one direction or the other from the dragging equipment detector so as to have said contact of the dragging equipment detector actuated only by traffic approaching said side track; a relay; circuit means for actuating said relay when said contact is actuated, said circuit means being ineffective to actuate said relay in response to the actuation of said detector mechanism with no train present in said stretch.

8. In a dragging equipment detector system for railroads comprising in combination, a stretch of railway track including a track circuit, a dragging equipment detector mechanism disposed in said stretch of track within said track circuit and comprising a yieldable barrier disposed across said stretch of track, said barrier having a contour to clear standard undercarriage equipment of railway cars but to be actuated by dragging equipment, a biasing mechanism connected to said barrier for biasing said barrier to a particular position but allowing it to be yieldable when struck by dragging equipment of a train, a circuit controlling contact operated by the actuation of said barrier from its normally biased position, a relay, circuit means for actuating said relay when said contact is operated only provided said track circuit is occupied by a train, and other means controlled by said relay.

9. In a dragging equipment detector system for railroads comprising in combination, a section of track connected to form a track circuit, a track relay for said track circuit, a dragging equipment detector mechanism mounted across the track of said section, said detector mechanism having a movable barrier of the self-restoring type positioned to allow the free passage of normal traffic but actuated to an operated position when contacted by dragging equipment of a passing car, said detector mechanism also having a normally closed contact opened by the actuation of said barrier to an operated position, and electro-responsive circuit means distinctively controlled by the opening of said contact only when said track relay indicates the presence of a train in said track section.

10. In a dragging equipment detector system for railroads comprising, a dragging equipment detector having a barrier of the biased self-restoring type which has a normally closed contact connected thereto but which contact is opened when said barrier is operated away from its biased position by dragging equipment of a passing vehicle, a stick relay, a stick circuit for said relay including its own front contact and energized dependent upon the closed condition of said normally closed contact of said detector, a pickup circuit for said stick relay energized following the closure of said normally closed contact of said detector only after a predetermined time, said predetermined time being measured by a time element relay, a track relay for the track section adjacent said dragging equipment detector, and electro-responsive signalling means controlled by said stick relay to give a distinctive indication throughout the time said stick relay is deenergized providing said track relay indicates the presence of a train, whereby a signal indication is given for an appreciable time following the temporary operation of said barrier regardless of the immediate reclosure of said normally closed contact of said detector if such operation occurs during the presence of a train.

GEORGE H. DRYDEN.

REFERENCES CITED

The following references are of record in the file of this patent:

UNITED STATES PATENTS

| Number | Name | Date |
| --- | --- | --- |
| 774,620 | Turner | Nov. 8, 1904 |
| 841,607 | Adams | Jan. 15, 1907 |
| 860,206 | Flora et al. | July 16, 1907 |
| 863,569 | Flora | Aug. 13, 1907 |
| 1,329,008 | Peycke | Jan. 27, 1920 |
| 1,794,595 | Dodgson | Mar. 3, 1931 |
| 1,812,183 | Vanstassel et al. | June 30, 1931 |
| 2,009,007 | Wenholz | July 23, 1935 |
| 2,035,525 | Bloss | Mar. 31, 1936 |
| 2,063,336 | Post | Dec. 8, 1936 |
| 2,083,288 | Bone | June 8, 1937 |
| 2,091,104 | Peterson et al. | Aug. 24, 1937 |
| 2,095,616 | Post | Oct. 12, 1937 |
| 2,401,294 | Clymer et al. | June 4, 1946 |
| 2,429,056 | Grosjean | Oct. 14, 1947 |